United States Patent [19]

Lee et al.

[11] 4,218,485

[45] Aug. 19, 1980

[54] PROCESS FOR PREPARING A BAKED COATED COMESTIBLE

[75] Inventors: Jean Lee, Dover, Del.; Janice R. Shaw, Yonkers; Carmine Giuliano, Hartsdale, both of N.Y.; Ned Butera, Bourbonnais, Ill.

[73] Assignee: General Foods Corporation, White Plains, N.Y.

[21] Appl. No.: 867,746

[22] Filed: Jan. 9, 1978

[51] Int. Cl.² .................. A23L 1/01; A23L 1/176
[52] U.S. Cl. ............................. 426/296; 426/555; 426/439
[58] Field of Search ............... 426/89, 250, 291, 293, 426/296, 62, 466, 523, 439, 289, 292, 295, 555

[56] References Cited

U.S. PATENT DOCUMENTS

| 3,586,512 | 6/1971 | Mancuso et al. | 426/250 |
| 3,723,137 | 3/1973 | Fischer et al. | 426/293 |
| 3,843,827 | 10/1974 | Lee et al. | 426/293 |
| 3,852,501 | 12/1974 | Fazzina et al. | 426/250 |
| 3,952,110 | 4/1976 | Knight et al. | 426/296 |
| 4,068,009 | 1/1978 | Rispoli et al. | 426/291 |

*Primary Examiner*—David M. Naff
*Attorney, Agent, or Firm*—Mitchell D. Bittman

[57] ABSTRACT

A baked coated comestible with the taste, texture and appearance of a fried coated comestible is prepared by coating a moistened comestible with a dry coating composition which comprises a farinaceous material containing bread crumbs and a flour, a binding agent containing a starch and a dextrin, and flavoring and coloring, followed by baking the coated comestible on a surface coated with a minimal amount of oil or fat.

14 Claims, No Drawings

PROCESS FOR PREPARING A BAKED COATED COMESTIBLE

BACKGROUND OF THE INVENTION

Many foods such as poultry, meat, fish and vegetables are coated with a light coating of flour or bread crumbs which on frying in oil develops into a characteristic crispy, brown-colored coating. However, the messiness involved with the preparation of fried foods, the ever-present danger of spattering oil, and the unfavorable dietary aspects associated with fried foods have led recently to the development of coatings which attempt to impart a fried appearance to a foodstuff which is baked and with the appealing color, taste, and texture associated with fried foods.

U.S. Pat. No. 3,586,512 by Mancuso et al. and U.S. Pat. No. 3,843,827 by Lee et al. both prepare a baked comestible with a fried texture and appearance. The Mancuso et al. patent does this by providing a dye system which changes color during cooking, while the Lee et al. patent provides a unique batter formulation and dry mix coating. While both these systems are effective, improvement would be desirable in the process of the Mancuso et al. patent in simulating the texture and mouthfeel characteristics of fried foods, while the Lee et al. patent has the drawback in that it requires a specific batter formulation, separate packaging for the batter formulation and dry mix coating, as well as relatively complicated consumer preparation.

Other coatings have been developed for foodstuffs for the same purpose, i.e., to provide a baked food with a surface similar in appearance, color and texture to that of coated, deepfat fried food, such as U.S. Pat. No. 3,852,501 by Fazzina et al. However, this coating relies on high levels of shortening to obtain the desired results.

Accordingly, it is an object of this invention to provide a baked coated comestible with the taste, texture and appearance of a fried coated comestible.

It is a further object of this invention to provide a dry coating composition which entails easy preparation for the consumer.

It is a still further object of this invention to provide an edible food coating in flowable form which may be readily applied to the comestible and does not have to be prepared in batter form.

Finally, it is an object of this invention to provide an edible food coating which will form a continuous crisp, pan fat fried-like coating when applied to comestibles followed by baking.

SUMMARY

Briefly stated, the objects of this invention are accomplished by moistening the surface of a comestible, then coating the moistened comestible with a unique dry coating composition, and then baking the coated comestible on a surface coated with a minimal amount of oil or fat. The dry coating composition comprises 67-80% of a farinaceous material, the farinaceous material containing 5-75% of bread crumbs and 5-75% of a flour, and 6-22% of a binding agent, the binding agent containing 3-19% of a starch and 3-19% of a dextrin, all percentages being by weight of the total dry coating composition. The balance of the ingredients are made up of flavoring and coloring.

DETAILED DESCRIPTION OF THE INVENTION

The dry coating composition of this invention basically comprises critical levels of farinaceous materials and binding agents as well as flavoring and coloring.

The farinaceous material must be present in the dry coating composition at a level of 67-80% by weight of the total dry coating composition, the farinaceous material containing from 5-75% by weight of the total dry coating composition of bread crumbs and 5-75% by weight of the total dry coating composition of a flour. The farinaceous materials being generally insoluble and functioning as bulking and filler materials to provide bulk to the coating and aid in crispness development which is essential in obtaining the texture and mouthfeel characteristics of fried, preferably pan fat fried-like foods.

The bread crumbs in the dry coating composition are at a level of 5-75%, preferably 30-45%, by weight of the total dry coating composition. The bread crumbs may be of a formulation and may be processed by any means common in the art, but preferably for optimum crispness Japanese bread crumbs are employed. By Japanese bread crumbs what is meant is that the bread crumbs consist essentially of wheat flour, yeast and salt, and have an elongated, porous and striated shape and structure. Other ingredients such as seasonings, shortening, milk solids, sugar minor amounts of other flours (e.g., rice, barley, soy, etc.), whey solids, etc., may also be added to the Japanese bread crumb formulation. Broadly the bread crumbs used in this invention have a particle size wherein at least 98% by weight of the crumbs pass through a U.S.S. 20 mesh screen, preferably at least 98% by weight of the crumbs pass through a U.S.S. 40 mesh screen.

The flour in the dry coating composition is at a level of 5-75% by weight of the total dry coating composition, the level of the flour being correlated to the level of bread crumbs in that the combined levels of bread crumbs and flour (i.e., the level of farinaceous materials) are 67-80% by weight of the total dry coating composition. A combination of corn and rice flours is preferably employed for optimum crispness, taste and uniformity. However other flours such as wheat, rye, potato or tapioca may be substituted. The level of corn flour employed is 5-70%, preferably 10-30%, and the level of rice flour employed is 5-70%, preferably 8-20%, all percentages being by weight of the total dry coating composition.

Additionally, the farinaceous material may contain a minor amount of cereal fines. However, the cereal fines are not meant to be used as a substitute for either the flour or the bread crumbs contained in the farinaceous material.

The binding agent must be present in the dry coating composition at a level of 6-22% by weight of the total dry coating composition, the binding agent containing from 3-19% by weight of the total dry coating composition of a starch, and 3-19% by weight of the total dry coating composition of a dextrin. The starch and dextrin together act as a binding system aiding uniform coating and adhesion of the coating to the comestible as well as promoting crispness development. The binding system also acts to minimize the amount of coating which is lost during baking.

The invention is applicable to all varieties of raw starch, for example, corn, tapioca, wheat, waxy sorghum, grain sorghum and alike. Further, applicable starches can include modified starches and derivatives of starches, for example, thin boiling starches, oxidized starches, starch ethers, starch esters and alike. Preferably the starch is a pregelatinized modified starch which is film forming and of low viscosity such as an acetylated pregelatinized waxy maize starch. The dextrin employed should have a Dextrose Equivalent (DE) within the range of 5-50, and includes malto dextrins, dextrins and corn syrup solids.

The residual ingredients of the dry coating composition include flavoring, coloring and can also include processing aids as well as preservatives, and are generally employed at a level of 7-25% by weight of the total dry coating composition. Generally the residual ingredients employed in the dry coating composition comprise salt at a level of 7-15%, lecithin (to prevent sticking of the comestible to the pan and to aid in cleanup) at a level up to 5%, seasoning (e.g., pepper, garlic powder, paprika, sugar, onion powder, monosodium glutamate, etc.) at a level of up to 5%, processing aids (e.g., silicon dioxide as a flow agent, etc.) at a level of up to 2%, preservatives (e.g., BHA, TBHQ) at a level up to 0.5% and coloring blends (e.g., FD&C approved colors, paprika, beet powder, annatto, tumeric, etc.) at a level up to 5%, all precentages being by weight of the total dry coating composition. Minor amounts of other ingredients such as shortening can also be added.

The dry coating composition is applied to the comestible by first moistening the surface of the comestible and then coating the moistened comestible with the dry coating composition by any means common in the art. Such common means include applying the coating composition to the moistened comestible in a closed bag containing the composition, or simply covering the moistened comestible with the coating composition.

After this coating step, the coated comestible is then placed in an oven and baked until done. Generally the temperature of the oven is within the range of about 325° to 450° F., preferably 425°-450° F. The coated comestible is baked on a surface covered with a minimal amount of oil or fat, (e.g., vegetable oil, shortening, etc.) i.e., at least a sufficient amount of oil or fat to cover the surface. This is done not only to prevent sticking of the comestible to the surface but to enhance the development of the fried taste, texture and appearance of the baked comestible.

The resultant baked coated comestible is found to have a uniform, crisp and adherent coating with the taste, texture and appearance of a pan fat fried comestible. Surprisingly the comestible itself is found to be more moist and have a higher yield by weight in comparison to its pan fat fried or its baked without coating counterparts.

Appropriate comestibles include such categories as meat, fish, poultry and vegetables. For example, chicken pieces, chicken cutlets, pork chops, fish fillets or vegetable strips are all suitable.

The following examples illustrate the various facets of the invention. It should be understood, however, that these examples are merely meant to be illustrative and the invention is not to be limited thereto.

Example I

A dry coating composition was prepared by mixing together the following ingredients:

|  | Parts/weight |
| --- | --- |
| Japanese Bread Crumbs | 39.0 |
| (98% by weight of crumbs passing through a U.S.S. 40 mesh screen) | |
| Corn Flour | 17.4 |
| Rice Flour | 12.2 |
| Acetylated Pregelatinized Waxy Maize Starch | 7.8 |
| Dextrin (10DE) | 7.8 |
| Salt | 11.2 |
| Lecithin | 2.3 |
| Paprika | 1.8 |
| Black Pepper | .1 |
| Artificial Colors | .1 |

A 2½ pound chicken was cut up into 8 pieces. The chicken pieces were moistened with water (about ¼ cup), and any excess was shaken off. Each moistened chicken piece was then dipped into the dry coating composition (about 100 grams of the dry coating composition for the 8 chicken pieces), turning and pressing the pieces to cover them completely and uniformly.

The coated chicken pieces were then placed skin side down in a 10"×15" baking pan which has 2 tablespoons of oil covering the pan surface. The pan with the chicken was then placed in an over preheated to 425° F. The chicken pieces were baked for 30 minutes and then turned over the baked for an additional 30 minutes longer, until the chicken was tender.

The resultant baked coated chicken was judged to have a uniform, crisp and adherent coating with the taste, texture and appearance of pan fat fried chicken. The chicken itself was also found to be relatively moist.

Example II

A fresh potato was cut into ⅛-½" slices, moistened and then coated with the dry coating composition as prepared in Example 1.

The coated potato slices were then placed in a 10"×15" baking pan which had 2 tablespoons of oil covering the pan surface. The pan with the potato was placed in an over preheated to 350° F. The potato pieces were baked for 20-25 minutes, turned over and baked for an additional 20-25 minutes until done.

The resultant baked coated potato was judged to have the taste, texture and appearance of a pan fat fried potato. The baked coated potato was also found to have a uniform, crisp and adherent coating.

What is claimed is:

1. Process for imparting a baked coated comestible with the taste, texture and appearance of a fried coated comestible comprising:
   moistening the surface of a comestible;
   coating said comestible with a dry coating composition consisting essentially of 67-80% of a farinaceous material, the farinaceous material containing 5-75% of bread crumbs consisting essentially of wheat flour, yeast and salt and having an elongated, porous and striated shape and structure and 5-75% of a flour containing 5-70% of a corn flour and 5-70% of a rice flour, and 6-22% of a binding agent, the binding agent containing 3-19% of a starch and 3-19% of a dextrin having a DE within the range of 5-50, all percentages being by weight of the total dry coating composition; and
   baking said coated comestible on a surface coated with a oil or fat.

2. Process of claim 1 wherein said dry coating composition further contains 7-25% of residual ingredients comprising flavor and color.

3. Process of claim 2 wherein the farinaceous material contains 10-30% of a corn flour, 8-20% of a rice flour and 30-45% of bread crumbs.

4. Process of claim 3 wherein said residual ingredients contain 7-15% of salt, up to 5% of lecithin, up to 5% of seasonings, up to 0.5% of preservatives and up to 5% of coloring blends.

5. Process of claim 3 wherein the starch is a pregelatinized modified starch.

6. Process of claim 1 wherein the bread crumbs have a particle size wherein at least 98% by weight of the crumbs pass through a U.S.S. 20 mesh screen.

7. Process of claim 6 wherein the bread crumbs have a particle size wherein at least 98% by weight of the crumbs pass through a U.S.S. 40 mesh screen.

8. A dry coating composition, which, when coated onto a moistened comestible and then baked on a surface coated with a oil or fat imparts the resultant comestible with the taste texture and appearance of a fried coated comestible consisting essentially of: 67-80% of a farinaceous material, the farinaceous material containing 5-75% of bread crumbs consisting essentially of wheat flour, yeast and salt, and having an elongated, porous and striated shape and structure and 5-75% of a flour containing 5-70% of a corn flour and; and 6-22% of a binding agent, the binding agent containing 3-19% of a starch and 3-19% of a dextrin having a DE within the range of 5-50, all percentages being by weight of the total dry coating composition.

9. Composition of claim 8 wherein said dry coating composition further contains 7-25% of residual ingredients comprising flavor and color.

10. Composition of claim 9 wherein the farinaceous material contains 10-30% of a corn flour, 8-20% of a rice flour and 30-45% of a bread crumbs.

11. Composition of claim 10 wherein said residual ingredients contain 7-15% of salt, up to 5% of lecithin, up to 5% of seasonings, up to 0.5% of preservatives and up to 5% of coloring blends.

12. Composition of claim 10 wherein the starch is pregelatinized modified starch.

13. Composition of claim 8 wherein the bread crumbs have a particle size wherein at least 98% by weight of the crumbs pass through a U.S.S. 20 mesh screen.

14. Composition of claim 13 wherein the bread crumbs have a particle size wherein at least 98% by weight of the crumbs pass through a U.S.S. 40 mesh screen.

* * * * *